United States Patent
White et al.

[15] 3,656,897
[45] Apr. 18, 1972

[54] CONCENTRATION OF PHOSPHORIC ACID

[72] Inventors: Arnold G. White, Trail, British Columbia; Thomas E. Smith, Rossland, British Columbia; Lyall C. Work, Dunnville, Ontario, all of Canada

[73] Assignee: Cominco Ltd., Montreal, Quebec, Canada

[22] Filed: June 2, 1969

[21] Appl. No.: 829,732

[30] Foreign Application Priority Data

June 4, 1968 Canada..................................21,706

[52] U.S. Cl..................................................23/165, 159/47
[51] Int. Cl..................................C01b 25/18, C01b 25/24
[58] Field of Search..............23/165, 165 D; 159/47, DIG. 1

[56] References Cited

UNITED STATES PATENTS

| | | | |
|---|---|---|---|
| 870,211 | 11/1907 | Zaremba | 219/289 |
| 3,044,851 | 7/1962 | Young | 23/107 |
| 3,387,929 | 6/1968 | Beltz et al. | 23/165 |
| 3,453,074 | 7/1969 | Mustian | 23/165 |

FOREIGN PATENTS OR APPLICATIONS

| | | | |
|---|---|---|---|
| 1,220,020 | 1/1960 | France | 23/165 |

Primary Examiner—Oscar R. Vertiz
Assistant Examiner—Gregory A. Heller
Attorney—Smart & Biggar

[57] ABSTRACT

A process for concentrating wet-process phosphoric acid by passing an alternating current between non-reactive, e.g. graphite, electrodes through an aqueous solution of wet-process phosphoric acid at an electrode surface current density in the range of about 5 to about 20 amperes per square inch, preferably about 7 to 15 amperes per square inch.

1 Claim, No Drawings

CONCENTRATION OF PHOSPHORIC ACID

BACKGROUND OF THE INVENTION

1. Field of the Invention

The invention relates to an improved process for concentrating wet-process phosphoric acid.

2. Description of the Prior Art

In the process for the manufacture of phosphoric acid according to the wet-process method, phosphate rock is reacted with sulphuric acid and the resulting slurry is filtered to obtain a relatively dilute phosphoric acid that contains usually around 30% $P_2O_5$. It is desired for the shipping of the acid and its use in subsequent manufacturing processes to concentrate the wet-process phosphoric acid, and several methods are used to obtain a more concentrated wet-process phosphoric acid.

Customarily the weak acid is concentrated in various types of steam-heated vacuum evaporators. Although efforts have been made to heat the acid under such conditions as to assure a relatively uniform heating of the acid, the acid is close to, or in contact with the heat-transfer means which makes it advisable in some cases to apply some form of agitation to prevent localized overheating. The vacuum evaporators therefore have the objectionable and inherent disadvantage of using heat-transfer surfaces which consequently and inevitably lead to the formation of scale deposits on these surfaces.

Phosphoric acid may also be concentrated by using high-temperature heating methods, consisting essentially in producing from a generator or an immersed burner hot gases at 1,000° C. or more, which hot gases are brought into contact with the acid to be concentrated. These methods suffer from several serious drawbacks because gases have to be handled which are extremely hot and which are entraining large volumes of fumes loaded with acid particles. These particles tend to form aerosols which cannot be collected completely, under practical conditions, thus leading to losses of acid and to atmospheric pollution.

Another method of concentrating dilute acid is by the use of electrical energy. Electrical energy is a well known source of power and is used in a multitude of applications. One of these is the conversion of electrical energy into heat. Electric heating associated with the flow of current through a substance or material, that is, a solid, a liquid, or a gas or vapour, of which the resistance is normally a specific property of the substance, is referred to as resistance heating, also known as "$I^2R$ effect". In cases where the substance is a liquid the electrical energy is normally applied to electrodes placed in the liquid.

One application is in the electro-chemical field where, for instance, electrical energy is supplied as a direct current to electrodes placed in a liquid, called the electrolyte. If, for example, a direct current is supplied to electrodes placed in an aqueous solution, reactions take place resulting in the evolution of hydrogen gas and oxygen gas at the electrodes or plating out of material at either electrode.

According to U.S. Pat. No. 2,839,408, issued June 17, 1958, phosphoric acids can be condensed electrolytically by applying a direct current to electrodes placed in the acid with evolution of hydrogen and oxygen. The obvious drawback of this process is the evolution of hydrogen and oxygen in the proportions as obtained from the electrolysis of water. As is well known, if not separated, the gases in these proportions are highly explosive. In the case of concentrating wet-process acid by this method, fluorine containing compounds will contaminate the hydrogen and oxygen which will impair their usefulness as raw materials. Also, the application of direct current might lead to plating out of impurities present in wet process phosphoric acid on the electrode surfaces.

The use of direct current has, moreover, the economic disadvantages of the added capital and operating costs inherent in the required rectification process.

In U.S. Pat. No. 1,688,679, issued Oct. 23, 1928, a process is described for heating liquids by electrical energy which consists of flowing the liquid used itself as a resistance through non-conducting structures having small interstitial spaces and passing an electric current through said liquid. The process, as conducted in the described apparatus, is unsuitable for the resistance heating or wet-process phosphoric acid. The impurities present in the wet-process phosphoric acid tend to either settle out, or crystallize out of the solution and clog the interstitial spaces. Care would also have to be taken in providing a continuous film of acid to flow through the structure. If, at any time, this continuous film should break at any place overheating would occur, which would lead to deposition of scale.

In U.S. Pat. No. 2,272,345, issued Feb. 10, 1942, a continuous process is described for dehydrating a hydrated salt having an inverted solubility curve by passing alternating current between electrodes placed in the saturated solution, causing the solution to become heated by reason of its resistance and cooling with water at least one of the electrodes below the temperature of the solution. This process proposes the use of alternating currents of low voltage and high amperage. The cooling of the electrode prevents the material from crystallizing on the electrode. However, this process is not suitable for the concentration of wet-process phosphoric acid. Experiments have shown scaling cannot be prevented, but can only be minimized and internal cooling of an electrode leads to appreciable heat losses through the cooling medium and scaling of the electrode.

A second method of converting electrical energy into heat is by means of an electric arc. In arc heating, an electric circuit is interrupted (by a gap), current continues to flow and, if the current is high enough to ionize some of the conductor, the gap is filled with a conducting vapour path which maintains the arc. This arc process is usually conducted in an arc furnace. The efficiency and power-factor of an arc furnace are maximal slightly above 90 percent and decrease with increasing current. The power supply to the electrodes in the furnace may be single or three phase.

In U.S. Pat. No. 3,044,851, issued July 17, 1962, the inventor describes, among the different heating techniques used in the production of concentrated phosphoric acids, the use of an arc furnace in which electrodes are placed connected to an alternating current supply and where an arc is drawn between the electrodes and the acid. Heating by the arc method has several drawbacks. Heat is generated by radiation from the arc. The high temperature of the arc causes ablation of the electrodes and local overheating of the acid which makes the occurrence of deposits likely. Because the position of the electrodes is quite critical, careful control is necessary to maintain constant operating conditions. Because an arc is drawn between electrode and acid through the vapour-phase and with the resultant high temperature of the arc, large quantities of vapours and entrained acid-droplets will evolve from the acid bath which, as with the submerged combustion techniques, lead to formation of aerosols and the problem of recovery and abatement of exhaust vapours. Reference is also made to electrical resistance heating whereby a resistance heater is immersed in the acid and a current is passed through to heat it and the surrounding acid.

SUMMARY OF INVENTION

It has now surprisingly been found that phosphoric acid, particularly wet-process phosphoric acid, can be conveniently concentrated by placing non-reactive electrodes in the acid and passing an alternating current through the acid at an electrode current density of between 5 and 20 amperes per square inch. Within this range of current densities the amount of scaling on the electrodes is minimized and the process can be operated in a substantially continuous manner. Particularly good results are obtained if the electrode current density is maintained within the range of 7 to 15 amperes per square inch.

DESCRIPTION OF THE PREFERRED EMBODIMENTS

When electrodes are placed in a body of phosphoric acid contained in a vessel and an AC potential is applied at these electrodes, a current will flow between the electrodes which is instantaneously converted into heat, which is evident from the boiling taking place in the acid. The boiling in the acid results in the evolution of water vapour and other volatile compounds which might be present in the phosphoric acid. As long as the current is applied the boiling continues and the acid becomes more concentrated.

Initially the dilute aqueous phosphoric acid as obtained by the wet-process method loses the free water present in the aqueous solution to the point where 100 percent acid is obtained. Then a further concentration of the 100 percent acid takes place and the acid loses further water, i.e., combined water, and dehydrates to the so called condensed or polyphosphoric acids. During the concentration process the temperature of the body of acid increases commensurate with the boiling point of the mixture present. Since the use of alternating current causes the ions of the ionized compounds to oscillate in the zone between the electrodes, no discharge of compounds takes place at the electrodes and the alternating current is substantially converted into heat; no polarization of the electrode takes place and no net-effect of an irreversible reaction at the electrodes is determinable.

In the continuous operation of our process dilute phosphoric acid is continuously fed to a vessel, which contains a number of electrodes partly immersed in acid to which an AC potential is applied and from which vessel the concentrated acid is continuously withdrawn. The vessel contains a quantity of acid of a certain concentration and at a temperature commensurate with the boiling point of the acid in the vessel. The dilute acid is concentrated in the acid present in the vessel and the main action taking place is the evolution of water vapour and other volatile substances which may be present in the feed to the vessel, whilst the acid feed becomes concentrated.

Two or more electrodes are placed in the vessel, the number commensurate with the number of phases of the electrical power supplied to the vessel. The AC potential can be supplied by one of a variety of sources of single or multiphase power, the power input into the vessel being regulated by varying the voltage of the power input and/or the resistance of the vessel contents.

A wide range of electrode current densities has been tested and it has been found that the electrode current density has a considerable effect on the amount of scaling on the electrodes and on the condition of the electrode material.

It will be understood that values for the electrode current density cited hereinafter are calculated on the basis of the depth of immersion of the electrodes having been measured under static conditions.

At low current densities on the immersed portion of the electrodes, i.e., below about 5 A/sq. in., the scaling of the electrodes becomes a distinct disadvantage and useless the electrodes are frequently descaled, the process can not be operated in a continuous manner. At high electrode current densities, i.e., above about 20 A/sq. in., ablation of the electrodes will take place which necessitates frequent replacements.

The process according to the invention can be operated within a range of current densities between about 5 A/sq. in., and about 20 A/sq. in., only necessitating very infrequent electrode descaling or replacements and preferably within a range of current densities between 7 and 15 A/sq. in. within which range the process can be operated in a continuous manner with a minimum of required maintenance.

The conversion of the alternating current into heat causes concentration of the phosphoric acid by the evolution of water vapour without the formation of difficult-to-recover mists or aerosols. The power efficiency of the process approaches 100 percent, which proves that the phosphoric acid is a true resistor.

The feed to the vessel can be wet-process phosphoric acid usually containing 28–32% $P_2O_5$, or a more dilute acid such as first filtrate from the wet process containing 20–22% $P_2O_5$, or an evaporated wet-process acid containing 36–42% $P_2O_5$ or higher. The product from the vessel can be, for instance acid containing 50–60% $P_2O_5$, or acids at higher concentration containing polyphosphoric acids, e.g., containing 82% $P_2O_5$ or higher.

The boiling point of phosphoric acid at a definite pressure is a function of its concentration. The degree of concentration of the product can, therefore, be controlled by monitoring the boiling point of the body of acid in the vessel.

The concentration of dilute phosphoric acid to a higher concentration by the described method results in evolution of large quantities of water vapour which create a violent agitation of the body of acid in the vessel and generate considerable foam. When starting up the process it is desirable, although not absolutely necessary, to have the vessel filled with the product acid of the higher concentration, rather than with dilute feed acid, which because of its dilution will yield excessive foaming. The amount of foam generated can easily be controlled by the use of standard defoaming agents such as silicones or fatty alcohols.

The process can be operated at atmospheric or sub-atmospheric pressure; the latter will lower the boiling point of the liquid in the vessel and will also facilitate the recovery of the evolved vapours. Operation under sub-atmospheric pressure and the recovery of the evolved vapours can be realized by any of well known methods, such as for example venturi-scrubbing.

The concentrated acid may be discharged from the vessel by either an overflow or an underflow discharge. An overflow discharge is less desirable because accumulation of sludge in the vessel may occur. Removal of this sludge as formed may not take place with the concentrated product acid. In addition, an overflow discharge could result in by-passing of the lighter feed acid to the product discharge, thus diluting the product acid. An underflow discharge reduces any possibility of by-passing in the vessel and also reduces the possibility of accumulation of sludge.

Particularly suitable electrodes for use in the process of the invention were made of graphite. Within the range of preferred electrode current densities graphite electrodes proved to be satisfactory: no ablation of the electrode material could be detected and little or no scaling took place on the electrode surface.

The materials of construction for the vessel have to be carefully selected due to the nature of the process and the chemical compounds handled. Materials suitable for the construction of the vessel include those that are, inter alia, corrosion resistant, have low or no electrical conductivity and can withstand prolonged operation at high temperature. The choice of material is dependent on the concentration of the acid being sought. Among the suitable materials for the vessel are fiber reinforced polyester, polytetrafluoroethylene, polypropylene, or acid resistant brick. Polypropylene was successfully used in the continuous concentration of dilute wet-process phosphoric acid to concentrated acid containing 50–60% $P_2O_5$ content. For the concentration to acids containing the polyphosphoric acids, acid resistant brick was used.

It is possible to apply electrical power of varying voltages, currents and number of power phases for the concentration process as described. For example, single phase or three phase power of 220 or 550 volt may be used. For instance, two electrodes and single phase power or three electrodes and three phase power can be used. The process is operated at relatively high voltages and low currents which results in economic advantages over processes operating at low voltages and high currents, in the cost of the power-supply equipment.

The invention will now be illustrated by the following non-limitative examples:

EXAMPLE 1

An insulated Pyrex vessel, 6 inch diameter and 9½ inches high, equipped with an underflow discharge was partly filled with wetpprocess phosphoric acid containing 50% $P_2O_5$.

Three graphite electrodes, 1 inch diameter and 9½ inches long, were immersed to a depth of 1½ inches in the acid forming an equilateral triangle configuration at 4 inch centers. Variable three-phase power was applied to the electrodes and held constant at 2,700 Watt. The applied voltage at the electrodes was 80 Volts at a current of 19.5 amperes creating a current density of 3.3 A/sq. in. on the immersed portion of the electrodes.

Into the vessel was fed wet-process phosphoric acid with a specific gravity of 1.36, containing about 30% $P_2O_5$, at a feed rate of approximately 100 ml/min. and from the vessel was discharged concentrated acid with a specific gravity of 1.70, containing about 50% $P_2O_5$, at a rate of approximately 50 ml/min. The temperature of the acid in the vessel was about 135° C.

The duration of the test was 96 hours. Scaling took place on the electrodes up to a thickness of one-half inch, but no loss of the electrode material was detected after the removal of the scale. This heavy scale formation indicated the process was operated at too low a current density.

EXAMPLE 2

An insulated vessel made of polypropylene equipped with an underflow discharge was partly filled with concentrated wet-process acid containing about 50% $P_2O_5$. Three graphite electrodes forming an equilateral triangle configuration were immersed in the acid in the vessel. The power applied to the electrodes was nominal 550 V three-phase power. The electrodes were immersed into the acid in the vessel to such a depth as was required to obtain a current density of 10.0 A/sq. in. on the immersed portion of the electrodes. Fresh, dilute wet-process acid, containing 30% $P_2O_5$ and having a specific gravity of 1.36, was charged to the vessel at a continuous rate of 3,130 ml/min. From the vessel was continuously discharged 1,500 ml/min. of concentrated wet-process acid with a specific gravity of 1.70 and containing 50% $P_2O_5$. The vessel operated continuously at an average temperature of the contents of about 135° C. The process operated smoothly for a period of 12 hours. Only a trace of scale formation was detected on the electrodes.

EXAMPLE 3

In a vessel as described in Example 2 three electrodes forming an equilateral triangle configuration were immersed in the acid. The power applied was nominal 220 V three-phase power held constant at 2,700 Watt. The electrodes were immersed to a depth of 2 inches into the acid, which provided an electrode current density of 17 A/sq. in. on the immersed portion of the electrodes. The duration of the test was 5 hours. A severe loss of the electrode material occurred, which was already apparent during the test, when the voltage required for the given power input increased rapidly, resulting in a value double of that at the commencement of the test.

EXAMPLE 4

In a vessel, 9½ inch diameter and 14 inches high, made of fiber reinforced polyester, were placed three graphite electrodes forming an equilateral triangle configuration. The electrodes were immersed in the acid in the vessel, while variable 220 Volt three-phase power was supplied to give a current density of 4.5 A/sq. in. on the immersed portion of the electrodes. Dilute phosphoric acid was fed into the vessel and concentrated acid was continuously removed through an underflow device. After 5 hours a hard scale had formed on the electrodes.

EXAMPLE 5

In the same vessel as in Example 4 the immersion of the electrodes in the acid was reduced to give an electrode current density of 6.8 A/sq. in., the other operating conditions being the same as during the test of Example 4. The amount of scale was considerably less.

EXAMPLE 6

This example shows it is possible to concentrate wet-process phosphoric acid to acid containing polyphosphoric acids in a continuous manner using the process of the invention.

In a vessel measuring 12 inches long, 2 inches wide and 10 inches high, constructed of acid resistant brick, equipped with an overflow discharge, two graphite electrodes 10 inches long, 1 7/8 inches wide and ½ inch thick were partially immersed in polyphosphoric acid of the required concentration, i.e., product concentration. Concentrated wet process acid containing 51.6% $P_2O_5$ was continuously fed into the vessel, while single phase power was applied at the electrodes at 250 V and 20 A for a power input of 5,000 Watt. Polyphosphoric acid containing 69.2% $P_2O_5$ was continuously discharged from the vessel. The temperature of the cell remained at 275° C. commensurate with the boiling point of the polyphosphoric acid produced. Under the operating conditions the polyphosphoric acid was quite fluid.

It will be understood of course that modifications can be made in the preferred embodiments of the invention described and illustrated herein without departing from the scope and purview of the appended claims.

What we claim as our invention is:

1. A continuous process for the concentration of wet-process phosphoric acid which comprises continuously feeding wet-process phosphoric acid containing 50–60% $P_2O_5$ into a body of boiling phosphoric acid of which at least part of said phosphoric acid is in the form of polyphosphoric acids, continuously passing an alternating current through said boiling phosphoric acid between graphite electrodes and maintaining a current density of between 7 and 15 amperes per square inch of immersed electrode surface and continuously withdrawing phosphoric acid of which at least part of the phosphoric acid is in the form of polyphosphoric acids.

* * * * *